(12) United States Patent
Gupta

(10) Patent No.: US 8,078,955 B1
(45) Date of Patent: Dec. 13, 2011

(54) METHOD AND APPARATUS FOR DEFINING TABLE STYLES

(75) Inventor: Rahul Gupta, Delhi (IN)

(73) Assignee: Adobe Systems Incorportaed, San Jose, CA (US)

(*) Notice: Subject to any disclaimer, the term of this patent is extended or adjusted under 35 U.S.C. 154(b) by 1050 days.

(21) Appl. No.: 11/416,693

(22) Filed: May 2, 2006

(51) Int. Cl.
G06F 17/00 (2006.01)

(52) U.S. Cl. ........ 715/217; 715/212; 715/219; 715/220; 715/227

(58) Field of Classification Search .................. 715/212, 715/214, 217, 219, 220, 227, 228
See application file for complete search history.

(56) References Cited

U.S. PATENT DOCUMENTS

| | | | |
|---|---|---|---|
| 5,598,519 A | 1/1997 | Narayanan | |
| 5,613,131 A * | 3/1997 | Moss et al. | 715/236 |
| 6,626,959 B1 * | 9/2003 | Moise et al. | 715/210 |
| 6,968,504 B2 | 11/2005 | Broman et al. | |
| 6,976,226 B1 | 12/2005 | Strong et al. | |
| 7,526,719 B1 * | 4/2009 | Gopalakrishnan | 715/227 |
| 7,533,332 B2 * | 5/2009 | Taboada et al. | 715/227 |
| 2002/0116417 A1 * | 8/2002 | Weinberg et al. | 707/517 |
| 2004/0194028 A1 * | 9/2004 | O'Brien | 715/517 |
| 2004/0210822 A1 | 10/2004 | Kotler et al. | |
| 2005/0001839 A1 | 1/2005 | Davis et al. | |
| 2005/0055626 A1 | 3/2005 | Kotler et al. | |
| 2005/0125377 A1 | 6/2005 | Kotler et al. | |
| 2005/0132280 A1 | 6/2005 | Broman et al. | |
| 2005/0149848 A1 | 7/2005 | Broman et al. | |
| 2005/0149871 A1 | 7/2005 | Broman et al. | |
| 2005/0188307 A1 | 8/2005 | Bailey et al. | |
| 2007/0050699 A1 * | 3/2007 | Simkhay et al. | 715/503 |
| 2007/0050700 A1 * | 3/2007 | Simkhay et al. | 715/503 |
| 2007/0094607 A1 * | 4/2007 | Morgan et al. | 715/762 |

OTHER PUBLICATIONS

Milind Bandekar, "OpenOffice.org 2.0", Oct. 23, 2005, Techtree.com Beta, pp. 1-9.*

* cited by examiner

*Primary Examiner* — Chau Nguyen
(74) *Attorney, Agent, or Firm* — Robert C. Kowert; Meyertons, Hood, Kivlin, Kowert & Goetzel, P.C.

(57) ABSTRACT

A system that facilitates a grid-based approach to defining styles for a table. During operation, the system allows a user to define a new table style by specifying styles for cells in a two-dimensional grid of table cells, wherein a style for a given cell specifies one or more attributes for the given cell. The system then applies the new table style to a target table, wherein applying the new table style involves repeating or tiling a pattern of cell styles defined in the two-dimensional grid across the target table.

24 Claims, 16 Drawing Sheets

USER INTERFACE 1400

TARGET TABLE 1402

| T2 | T2 | T3 | T3 | T3 | T3 | T3 | T3 | T3 | T3 | T2 | T2 |
|----|----|----|----|----|----|----|----|----|----|----|----|
| T2 | T2 | T3 | T3 | T3 | T3 | T3 | T3 | T3 | T3 | T2 | T2 |
| T4 | T4 |    |    |    |    |    |    |    |    | T4 | T4 |
| T4 | T4 |    |    |    |    |    |    |    |    | T4 | T4 |
| T4 | T4 |    |    |    |    |    |    |    |    | T4 | T4 |
| T4 | T4 |    |    |    |    |    |    |    |    | T4 | T4 |
| T4 | T4 |    |    |    |    |    |    |    |    | T4 | T4 |
| T2 | T2 | T3 | T3 | T3 | T3 | T3 | T3 | T3 | T3 | T2 | T2 |
| T2 | T2 | T3 | T3 | T3 | T3 | T3 | T3 | T3 | T3 | T2 | T2 |
| T2 | T2 | T3 | T3 | T3 | T3 | T3 | T3 | T3 | T3 | T2 | T2 |

FIG. 14

METHOD AND APPARATUS FOR DEFINING TABLE STYLES

BACKGROUND

1. Field of the Invention

The present invention relates generally to techniques for editing documents or user interfaces. More specifically, the present invention relates to a method and an apparatus that facilitates a grid-based approach to defining table styles.

2. Related Art

Tables are commonly used to represent information within documents because they can efficiently present information in an intuitive structured format. However, data within tables can sometimes be hard to read. For example, an individual cell within a table can be difficult to distinguish from adjacent cells, especially if the table contains a large number of cells. Furthermore, it is often difficult to trace the column and the row for a given cell back to the corresponding column header and the corresponding row header. Hence, it is often desirable to add attributes, such as cell coloring, to cells within the table which can emphasize and/or distinguish cells from each other, thereby making the contents of the table easier to read.

Table styles can be defined using several techniques. One such technique involves individually setting attributes for each cell within the table. These attributes can include table-level attributes, row-level attributes, cell-level attributes, and text attributes. Table-level attributes can include table dimensions and stroke/border attributes (e.g. width and color of the table/cell border). Row-level attributes can include row height and keep options. (Keep options specify how paragraphs flow across pages or columns within a document. For example, one keep option keeps a first paragraph and a second paragraph on the same page.) Cell-level attributes can include stroke, fill, diagonal lines, cell insets (i.e. the space between the cell border and text within the cell), vertical justification, and text rotation. Text attributes can include paragraph and character attributes.

Another technique for defining table styles involves first selecting a pre-defined pattern, then defining the attributes to use for the pre-defined pattern, and finally applying the pattern of attributes to a target table. For example, Microsoft® Word provides several pre-defined table style patterns which include: whole table, header row, last row, left column, right column, odd row stripes, even row stripes, odd column stripes, even column stripes, top left cell, top right cell, bottom left cell, and bottom right cell. Note that a stripe is a contiguous row or a contiguous column of similar attributes. For example, if the user chooses an odd row stripe pattern, the attributes defined for this pattern is repeated on every cell within an odd-numbered row. Also note that Microsoft® Word enables a user to define a "band" of row/column stripes which allows up to three contiguous rows/columns to contain the same attributes. For example, a user can specify that red is to be applied to alternating rows and that the width of the band should be two rows wide. Hence, the system fills in two rows of red cells, then two rows of white cells (i.e. the default cell background color), then two rows of red cells, etc. in the target table.

Another technique involves applying a custom pattern of attributes to a target area within a spreadsheet application. For example, in the Microsoft®Excel® spreadsheet application, a user can define a pattern of color fills which can then be applied to a target area of the spreadsheet. However, there are several limitations to this technique. First, the target area must be an integer multiple of the area (both in x and y directions) containing the pattern to be tiled or repeated. If the target area is not an integer multiple of the area containing the pattern, the pattern is applied to an area within the target area which occupies exactly the same area as the area of the pattern. Second, not all attributes are applied to the target area. For example, whereas color fills and text attributes are applied to the target area, row heights and column widths are not applied to the target area. (Note that in Microsoft® Excel® 2003, the cell formatting can be copied without copying the contents of the area containing the pattern to be tiled.) Third, there is complete lack of control in applying the pattern to the target area. Changing the area containing the pattern to be tiled does not change the target areas where the pattern was applied (or was re-applied)

Unfortunately, there is no way to generically define a table style which can support all the patterns and attributes for the table or target area. Hence, what is needed is a method and an apparatus for defining and applying table styles to a target table without the problems described above.

SUMMARY

One embodiment of the present invention provides a system that facilitates a grid-based approach to defining styles for a table. During operation, the system allows a user to define a new table style by specifying styles for cells in a two-dimensional grid of table cells, wherein a style for a given cell specifies one or more attributes for the given cell. The system then applies the new table style to a target table, wherein applying the new table style involves repeating or tiling a pattern of cell styles defined in the two-dimensional grid across the target table.

In a variation on this embodiment, while specifying styles for cells in the two-dimensional grid of table cells, the system allows a user to specify styles for cells in a grid area, which is part of a user-interface for defining table styles.

In a further variation, while applying the new table style to the target table, the system allows the user to identify the target table or a portion of the target table to which the new table style is applied. The system then applies the new table style to the identified target table or to a portion of the identified target table.

In a further variation, if a portion of the identified target table is not selected, the system applies the new table style to the entire identified target table.

In a variation on this embodiment, the system defines a new table style by specifying styles for cells in a three-dimensional grid of table cells. The system then applies the new table style to the target table by repeating or tiling the pattern of cell styles defined in the three-dimensional grid across the target table.

In a variation on this embodiment, the new table style can be associated with one or more sub-table styles. The sub-table styles are applied to special areas of the target table, wherein the special areas of the target table include corner cells, header rows, footer rows, first columns, and last columns.

In a variation on this embodiment, the attributes for cells can include: row attributes; column attributes; text attributes; and cell attributes.

In a further variation, the row attributes can include row height and keep options, wherein keep options specify how paragraphs should flow across pages or columns within a given document.

In a further variation, the column attributes can include column width.

In a further variation, the text attributes can include paragraph attributes, character attributes, and nested style information.

In a further variation, the cell attributes can include stroke, fill color, fill style, overprint, gap color, diagonal lines, cell insets, vertical justification, baseline, clipping, and text rotation.

In a variation on this embodiment, if a table style is updated, the system updates all target areas within the target table where the table style is applied.

In a variation on this embodiment, the pattern of cell styles is repeated or tiled in a user-specified direction.

In a variation on this embodiment, an object can be divided into a mesh of finite cells, wherein the object does not need to be rectilinear. The pattern of cell styles is then repeated or tiled onto the object.

In a variation on this embodiment, a time interval and an operation on the target table are attributes, wherein the operation can include a rotation, a mirroring, or another operation which changes the pattern of a cells style. After the time interval has elapsed, the operation is performed on the target table.

In a variation on this embodiment, wherein while repeating or tiling the pattern of cell styles defined in the two dimensional grid across the target table, the system skips a specified number of rows and/or columns before repeating or tiling the pattern of cell styles to subsequent cells within the target table.

BRIEF DESCRIPTION OF THE FIGURES

FIG. 14 illustrates table styles applied to specific regions of a target table in accordance with an embodiment of the present invention.

DETAILED DESCRIPTION

Figure 1:
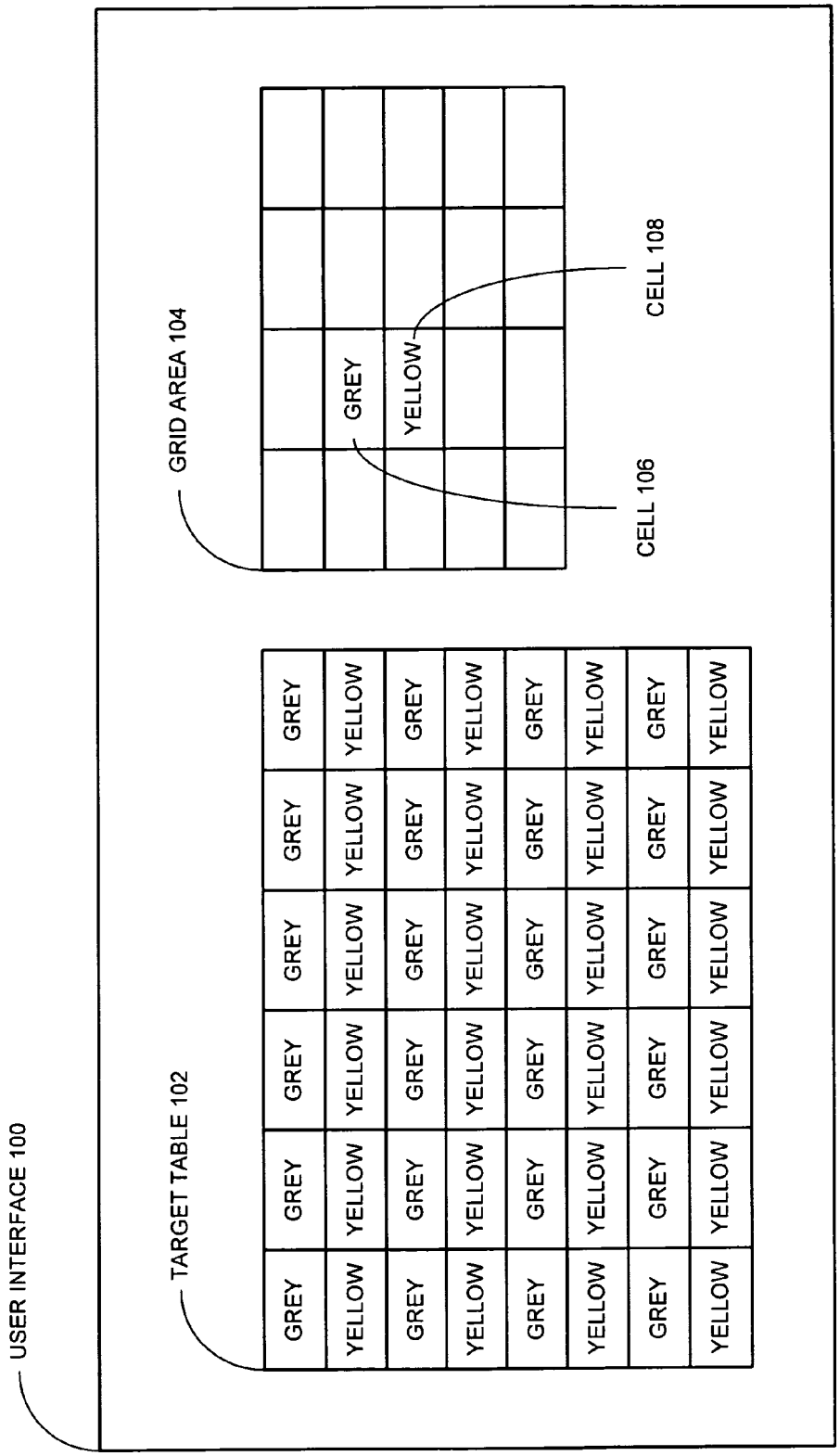
FIG. 1 illustrates a pattern of cell attributes which is applied to a target table in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention allows a user to define a table style by specifying styles for cells in a grid of table cells. The system then applies the table style to a target table within the document by tiling or repeating a pattern of cell styles defined in the grid of table cells across the target table. In one embodiment of the present invention, the user defines a pattern of cell styles in a two-dimensional grid area. This grid area can be part of a user-interface for defining table styles. The pattern of cell styles is then repeated or tiled across a two-dimensional target table.

In another embodiment of the present invention, the user defines a pattern of cell styles in a three-dimensional grid area. In this embodiment, the pattern of cell styles is repeated or tiled across a three-dimensional target table.

In one embodiment of the present invention, the user is allowed to identify the target table or a portion of the target table to which the new table style is applied. The system then applies the new table style to the identified target table or to a portion of the identified target table. In one embodiment of the present invention, if a portion of the identified target table is not selected, the system applies the new table style to the entire identified target table.

In one embodiment of the present invention, each grid element in the grid area contains an object style for a table cell. An object style defines a cell style, which includes an aggregation of attributes which can include: row attributes, column attributes, text attributes, and cell attributes. Note that the present invention can be applied to any attribute and is not limited to the attributes discussed below.

In one embodiment of the present invention, the row attributes can include row height and keep options, wherein keep options specify how paragraphs should flow across pages or columns within a given document.

In one embodiment of the present invention, the column attributes can include column width.

In one embodiment of the present invention, the text attributes can include paragraph attributes, character attributes, and nested style information. Note that nested style information includes attributes that are inherited by default. For example, these inherited attributes can include paragraph and character styles.

In one embodiment of the present invention, the cell attributes can include stroke (i.e. the thickness of cell borders), fill color, fill style, overprint, gap color (color of the cell border), diagonal lines, cell insets (i.e. the space between the cell borders and the text within a cell), vertical justification, baseline, clipping, and text rotation. Note that overprint is an attribute which forces one ink color to print on top of another ink color.

In one embodiment of the present invention, the table style is re-usable, thereby providing a consistent look-and-feel when applied to multiple tables and/or table selections.

In one embodiment of the present invention, while defining or modifying the pattern in the grid area, the pattern is automatically applied to the target table (or to a portion of the target table), thereby allowing the user to continuously preview the effect of modifying the pattern in the grid area.

One embodiment of the present invention allows a user to define an arbitrary pattern of attributes. Hence, a user is not restricted to defining alternating rows/columns of attributes.

FIG. 14 illustrates table styles applied to specific regions of target table 1402 within user interface 1400 in accordance with an embodiment of the present invention. In FIG. 14, the user specifies a first table style, T1, which is applied to the entire target table 1402. (Note that table style T1 is applied to the unlabeled cells in the target table 140, but for clarity, is not shown). In one embodiment of the present invention, the user can specify other table styles which are associated with table style T1, and which are applied to special areas of target table 1402. In one embodiment of the present invention, the special areas include the four corners of the target table (i.e. top-left corner, top-right corner, bottom-left corner, and bottom-right corner), the header and the footer rows, and the first and the last columns. In one embodiment of the present invention, the dimensions (i.e. the cell area) of the special areas can be set by the user (e.g. a 2×2 top-left corner, a 3×2 bottom-right corner, etc.).

For example, in FIG. 14, the user associates table style T1 with: (1) table style T2, which is applied to the four corners of target table 1402 (i.e. the 2×2 area in the top-left and the top-right corners, and the 3×2 area in the bottom-left and the bottom-right corners); (2) table style T3, which is applied to the two header rows and three footer rows of target table 1402; and (3) table style T4, which is applied to the two left columns and two right columns of target table 1402. In one embodiment of the present invention, if the application of table styles to the special areas of the target table causes more than one table style to be applied to a given cell, a user can select an option which causes the application of table styles in these special areas of the target table to be mutually exclusive, a union, or some other logical function of the overlapping table styles.

One embodiment of the present invention allows a user to define stroke overrides for the target table.

In one embodiment of the present invention, if the target table (or portion of the table) is not an integer multiple of the pattern area, the system tiles or repeats the pattern defined in the grid area such that the pattern is repeated or tiled up to the point where the boundaries of the target table (or portion of the target table) is reached. In other words, the system can stop repeating or tiling the pattern defined in the grid area at any cell within the pattern defined in the grid area. In one embodiment of the present invention, the system can tile the pattern in any direction. For example, the system can tile the pattern from left-to-right, right-to-left, top-to-bottom, bottom-to-top, etc.

Note that these techniques can be applied to any grid area. For example, the grid areas can include tables, spreadsheet cells, and elements in a finite element analysis application. Furthermore, note that the grid area does not need to be rectilinear. In one embodiment of the present invention, any object (including life-sized objects) can be divided in to a mesh (i.e. 2-D/3-D grid) of finite cells. The object can then be colored with a pattern (defined by a grid) using the present invention.

Defining and Applying Table Styles

Consider a table, T, having m×n table cells and a subset of the grid area T, which is m'×n' (where m'<=m and n'<=n) having grid area, G (where G<=T). Each cell in grid area G represents an object style, which defines attributes for the cell. A new table style, $TS_1$, is represented by a pattern of object styles in grid area G, which is tiled or repeated across the cells of table target (or across a portion of the target table) to provide the defined table formatting.

FIG. 1 illustrates a pattern of cell attributes which is applied to a target table 102 within user interface 100 in accordance with an embodiment of the present invention. In FIG. 1, the user sets the color in cell 106 to grey and sets the color in cell 108 to yellow. The system interprets the pattern as representing alternating rows of grey and yellow cells, and repeats or tiles the alternating rows of grey and yellow cells defined in grid area 104 across target table 102.

Figure 2:
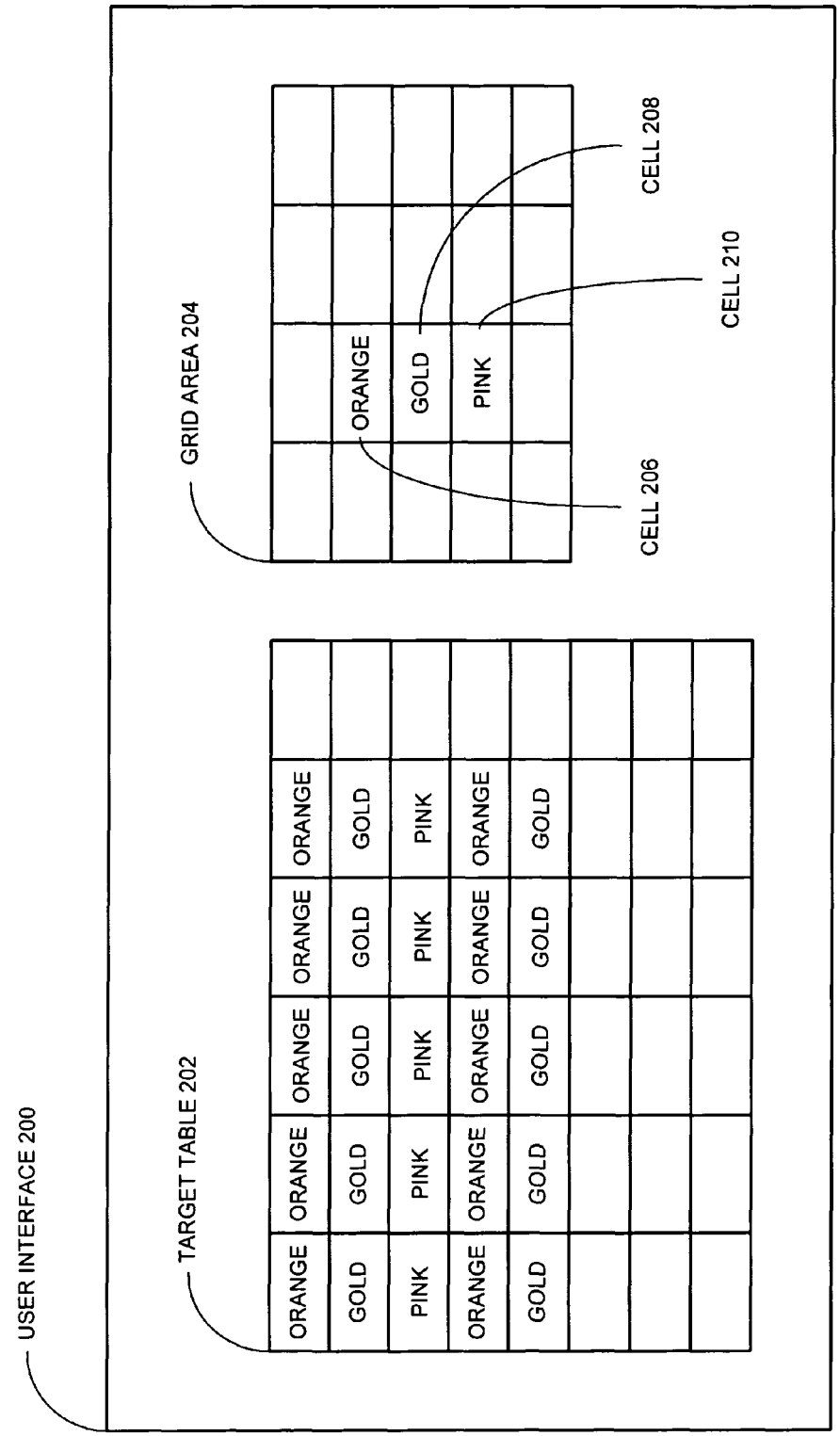
FIG. 2 illustrates a pattern of cell attributes which is applied to a portion of the target table in accordance with an embodiment of the present invention.

FIG. 2 illustrates a pattern of cell attributes which is applied to a portion of target table 202 within user interface 200 in accordance with an embodiment of the present invention. In FIG. 2, the user sets the color in cell 206 to orange, sets the color in cell 208 to gold, and sets the color in cell 210 to pink. The system interprets the pattern as representing alternating rows of orange cells, gold cells, and pink cells, and repeats or tiles the alternating rows of orange, gold, and pink cells defined in grid area 204 across target table 202. Note that only a portion of target table 202 has the pattern defined in grid area 204 (i.e. the 5×5 subset of cells in target table 202). In one embodiment of the present invention, a user selects a portion of a target table to be filled with a pattern of cell attributes defined in a grid area. In another embodiment of the present invention, if a portion of the target table is not selected, the pattern defined in the grid area is repeated or tiled in the entire target table.

Figure 3:
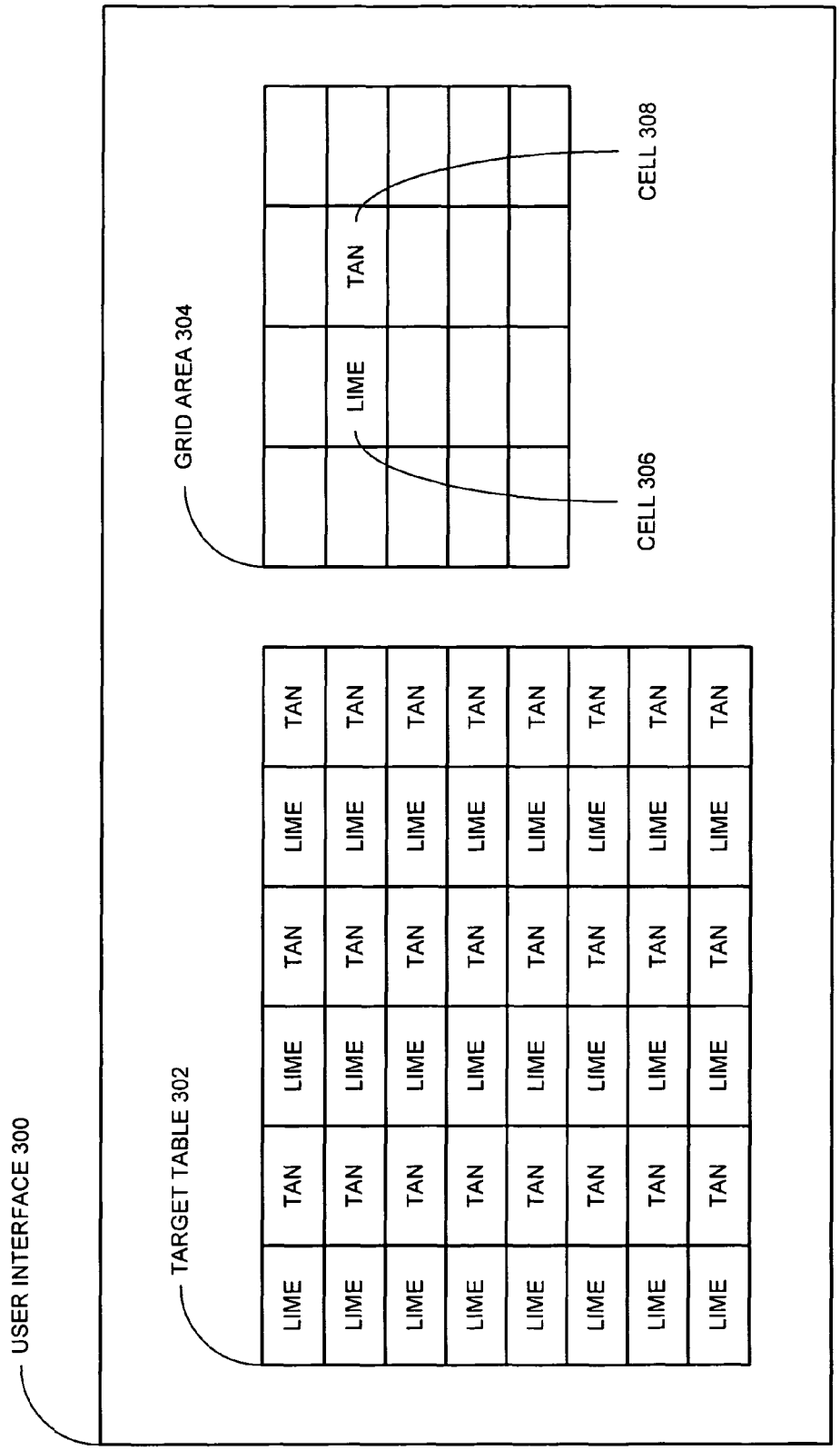
FIG. 3 illustrates another pattern of cell attributes which is applied to the target table in accordance with an embodiment of the present invention.

FIG. 3 illustrates another pattern of cell attributes which is applied to target table 302 within user interface 300 in accordance with an embodiment of the present invention. In FIG. 3, the user sets the color in cell 306 to lime and sets the color in cell 308 to tan. The system interprets the pattern as representing alternating columns of lime and tan cells, and repeats or tiles the alternating columns of lime and tan cells defined in grid area 304 across target table 302.

Figure 4:
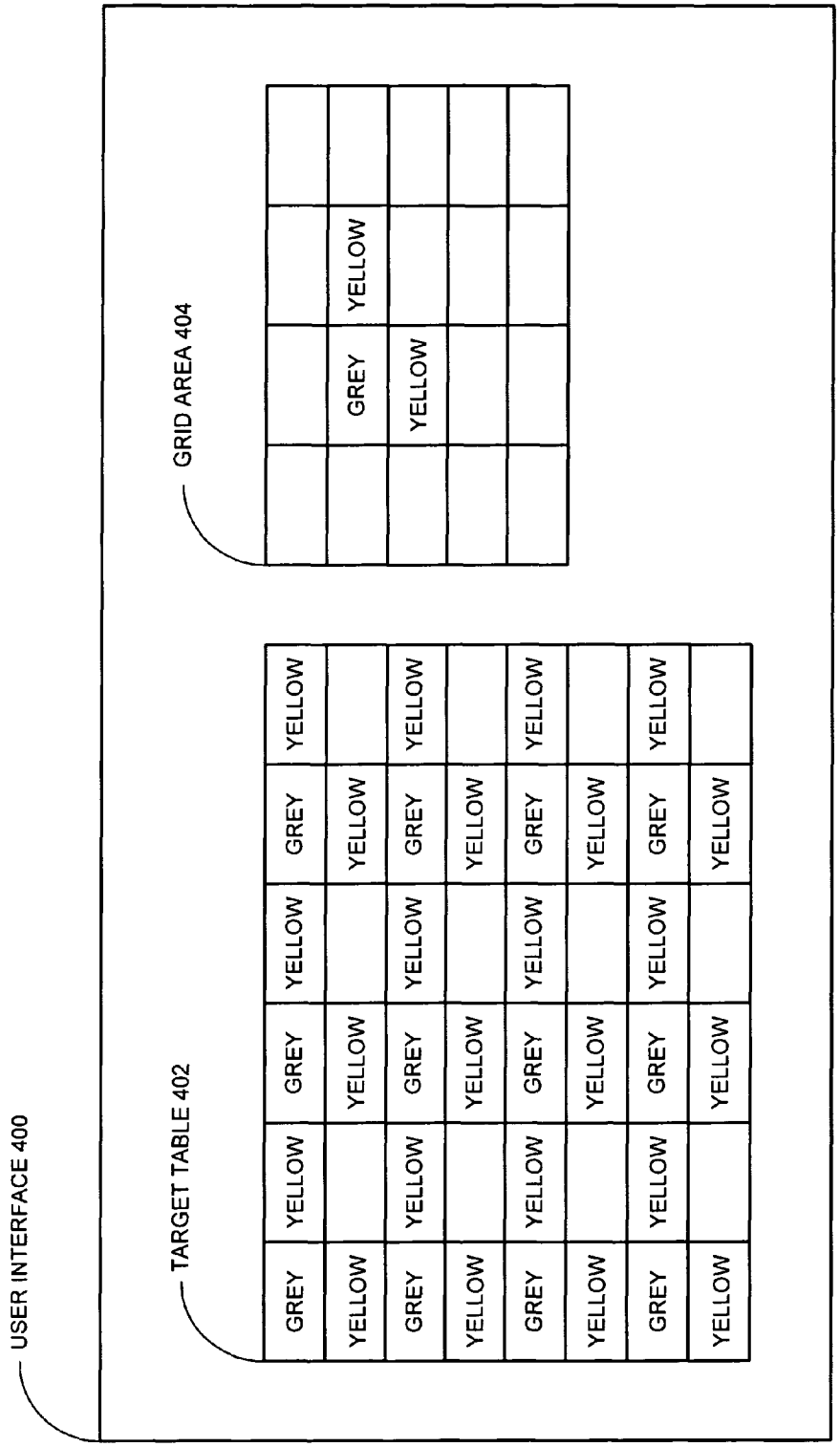
FIG. 4 illustrates a customized pattern of cell attributes which is applied to the target table in accordance with an embodiment of the present invention.

FIG. 4 illustrates a customized pattern of cell attributes which is applied to target table 402 within user interface 400 in accordance with an embodiment of the present invention. In FIG. 4, the user defines a pattern of cell attributes in grid area 404 and the system repeats or tiles the pattern of cell attributes defined in grid area 404 across target table 402.

In one embodiment of the present invention, cells without labels in table 402 are cells with the default background color (e.g. white). In another embodiment of the present invention, cells without labels in target table 402 are cells with a previously-defined background color.

Figure 5:
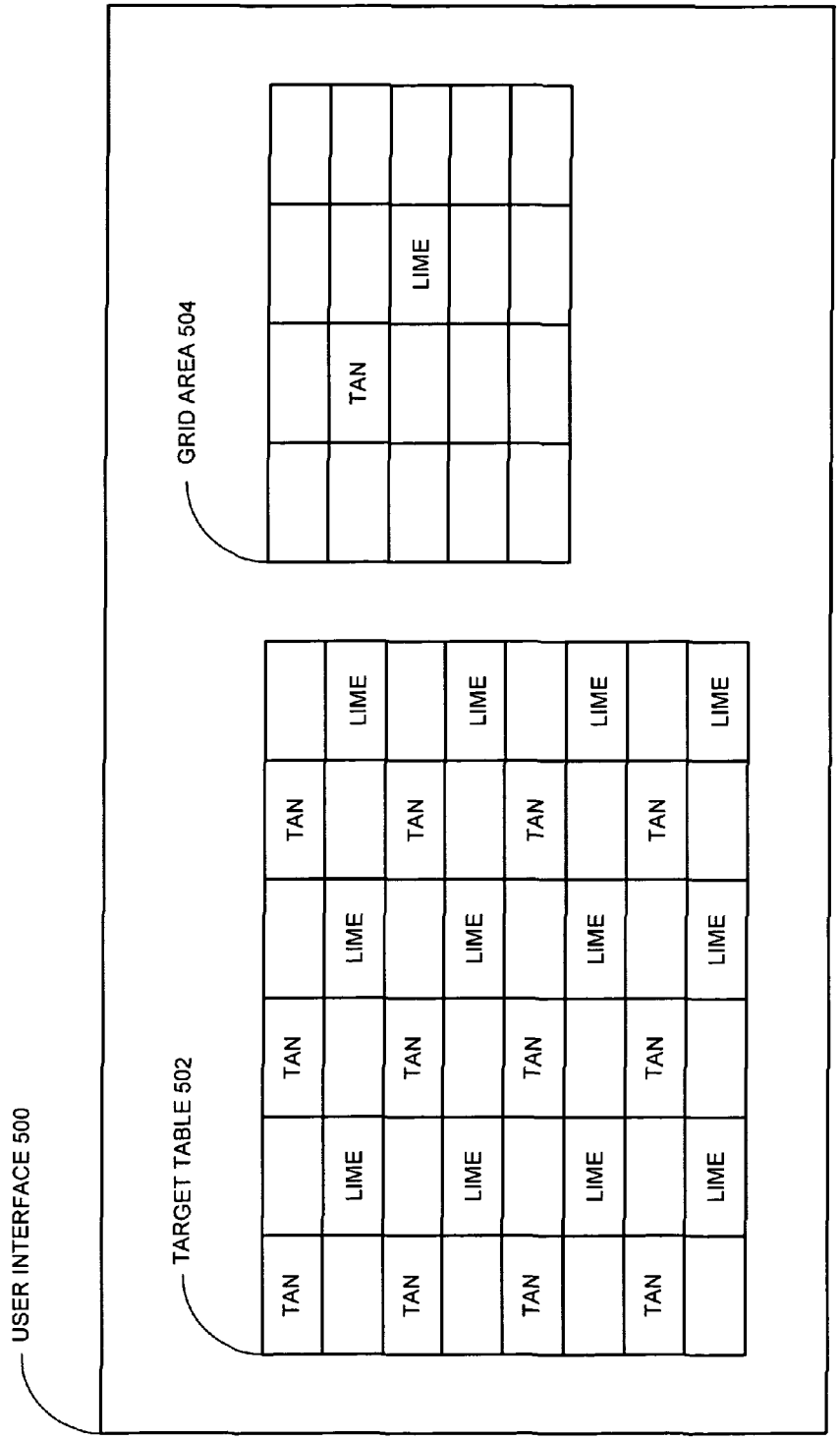
FIG. 5 illustrates another customized pattern of cell attributes which is applied to the target table in accordance with an embodiment of the present invention.

FIG. 5 illustrates another customized pattern of cell attributes which is applied to target table 502 within user interface 500 in accordance with an embodiment of the present invention. In FIG. 5, the user defines a pattern of cell attributes in grid area 504 and the system repeats or tiles the pattern of cell attributes defined in grid area 504 across target table 502.

Figure 6:
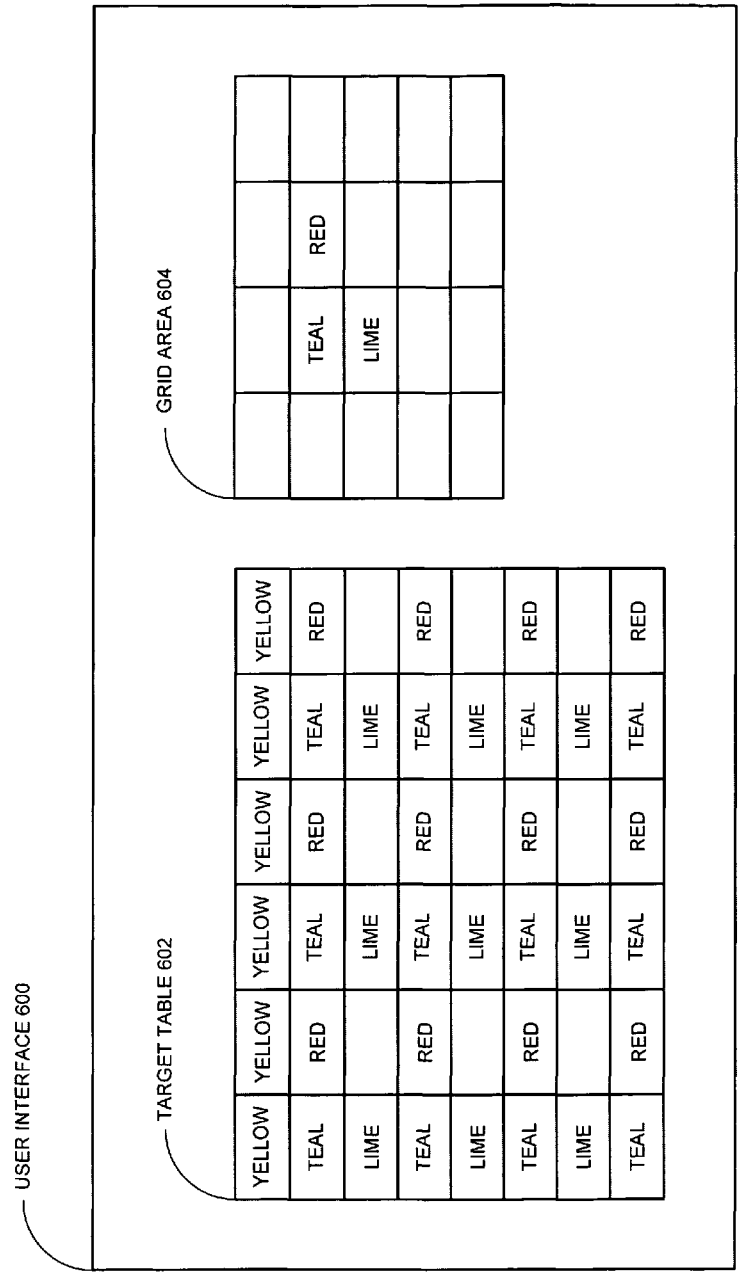
FIG. 6 illustrates another customized pattern of cell attributes which is applied to the target table in accordance with an embodiment of the present invention.

FIG. 6 illustrates another customized pattern of cell attributes which is applied to the target table 602 within user interface 600 in accordance with an embodiment of the present invention. In FIG. 6, the user defines a pattern of cell attributes in grid area 604 and the system repeats or tiles the pattern of cell attributes defined in grid area 604 across target table 602.

Figure 7:
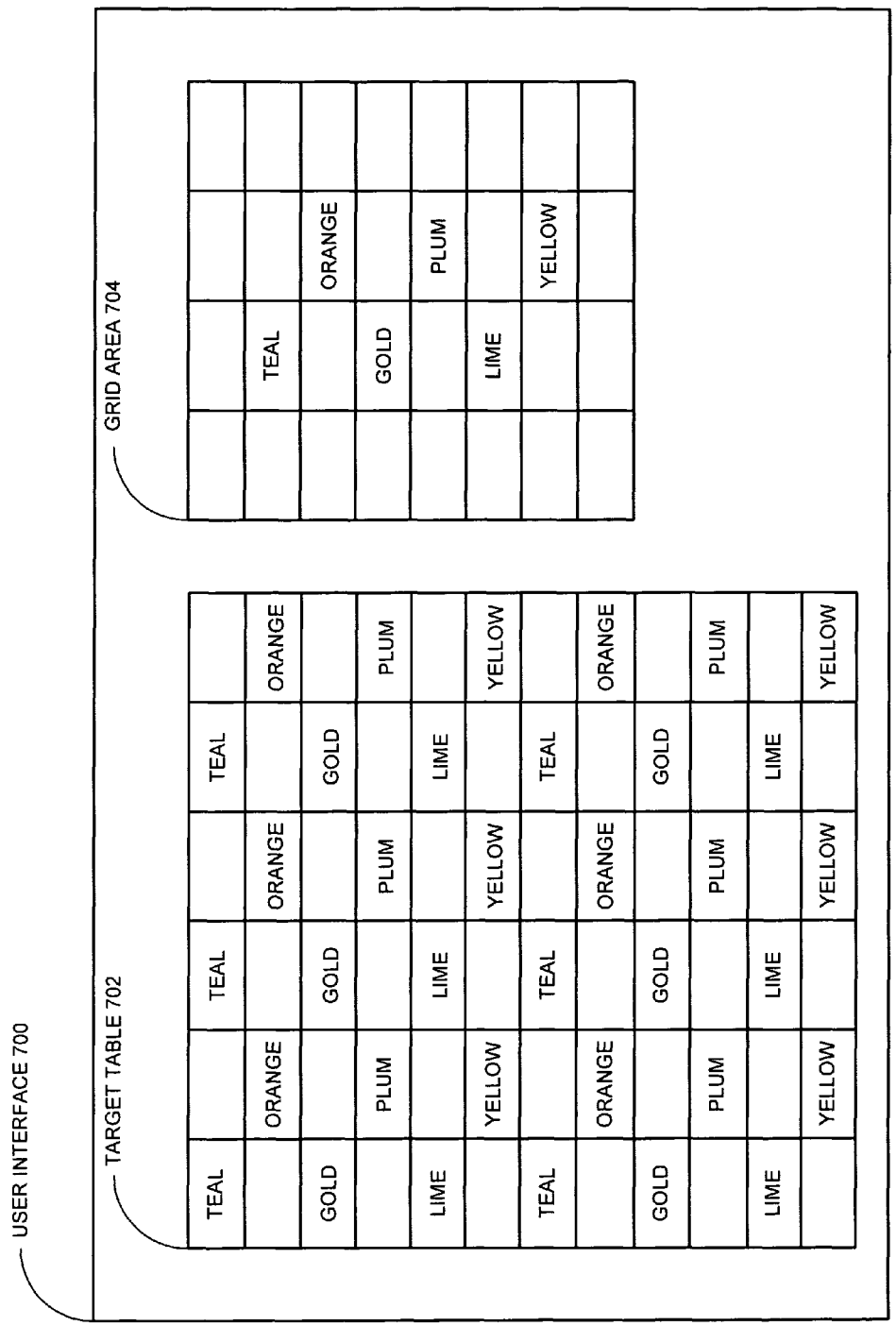
FIG. 7 illustrates a complex pattern of cell attributes which is applied to the target table in accordance with an embodiment of the present invention.

FIG. 7 illustrates a complex pattern of cell attributes which is applied to target table 702 within user interface 700 in accordance with an embodiment of the present invention. In FIG. 7, the user defines a pattern of cell attributes in grid area 704 and the system repeats or tiles the pattern of cell attributes defined in grid area 704 across target table 702.

Figure 8:
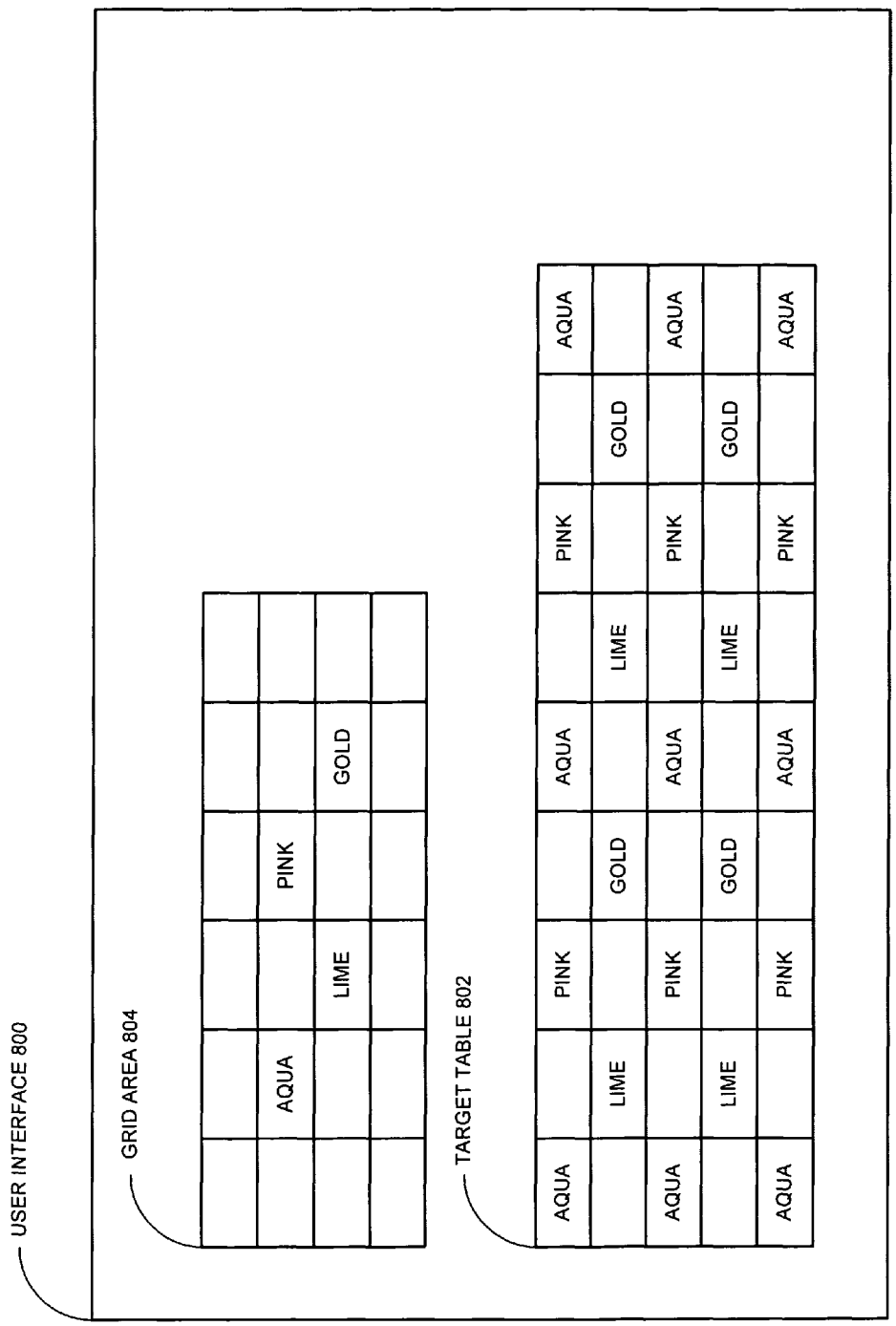
FIG. 8 illustrates another complex pattern of cell attributes which is applied to the target table in accordance with an embodiment of the present invention.

FIG. 8 illustrates another complex pattern of cell attributes which is applied to target table 802 within user interface 800 in accordance with an embodiment of the present invention. In FIG. 8, the user defines a pattern of cell attributes in grid area 804 and the system repeats or tiles the pattern of cell attributes defined in grid area 804 across target table 802.

Figure 9:
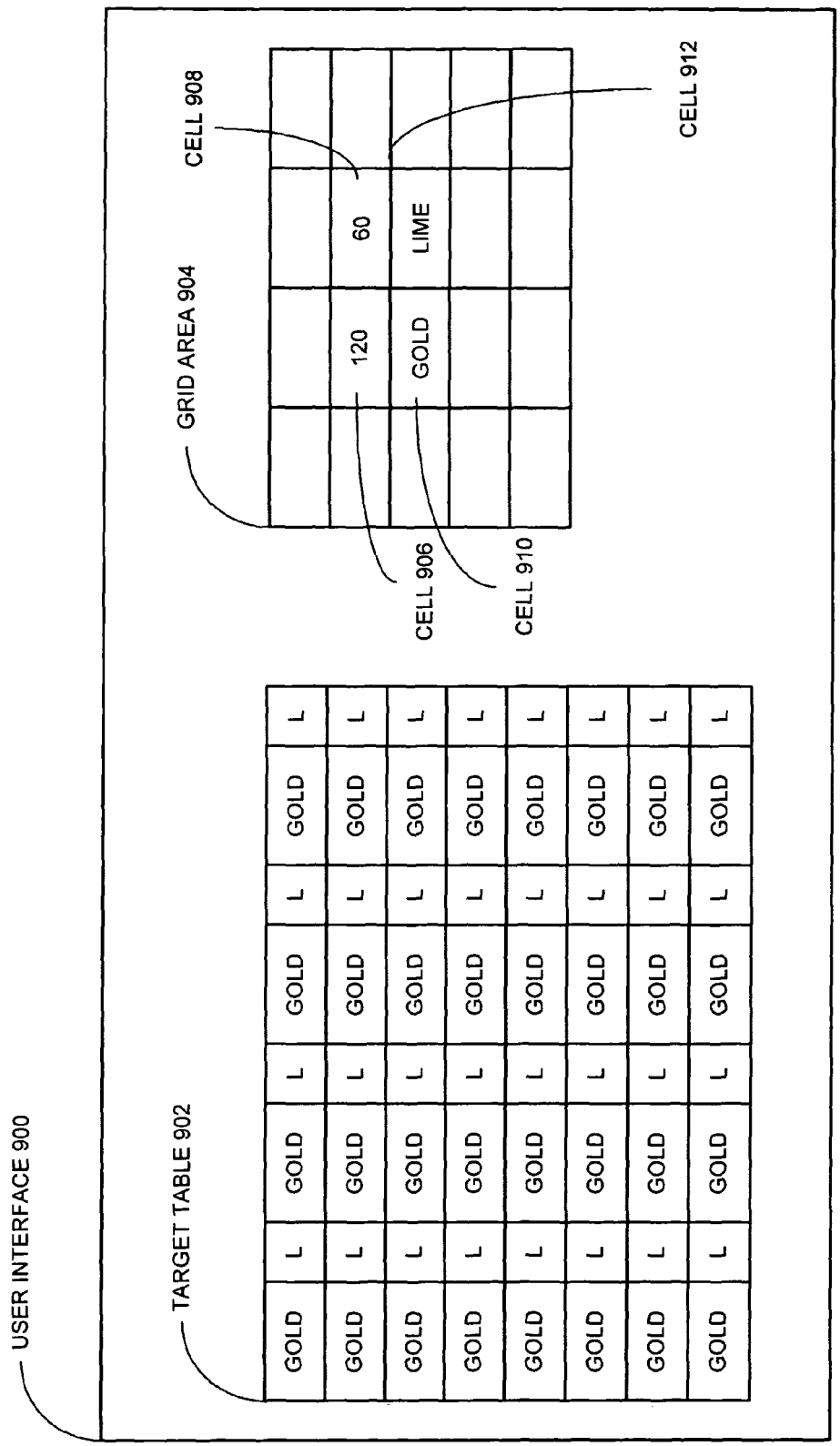
FIG. 9 illustrates a pattern of column widths which is applied to the target table in accordance with an embodiment of the present invention.

FIG. 9 illustrates a pattern of column widths which is applied to target table 902 within user interface 900 in accordance with an embodiment of the present invention. In FIG. 9, the user defines a pattern of cell attributes in grid area 904. The user defines a pattern of alternating column widths by setting cells 906 and 908 to 120 units and 60 units, respectively. The user also defines a pattern of alternating column colors by setting cells 910 and 912 to gold and lime, respectively. The system repeats or tiles the pattern of cell attributes defined in grid area 904 across target table 902. Note that the gold-colored columns are 120 units wide and the lime-colored columns are 60 units wide.

Figure 10:
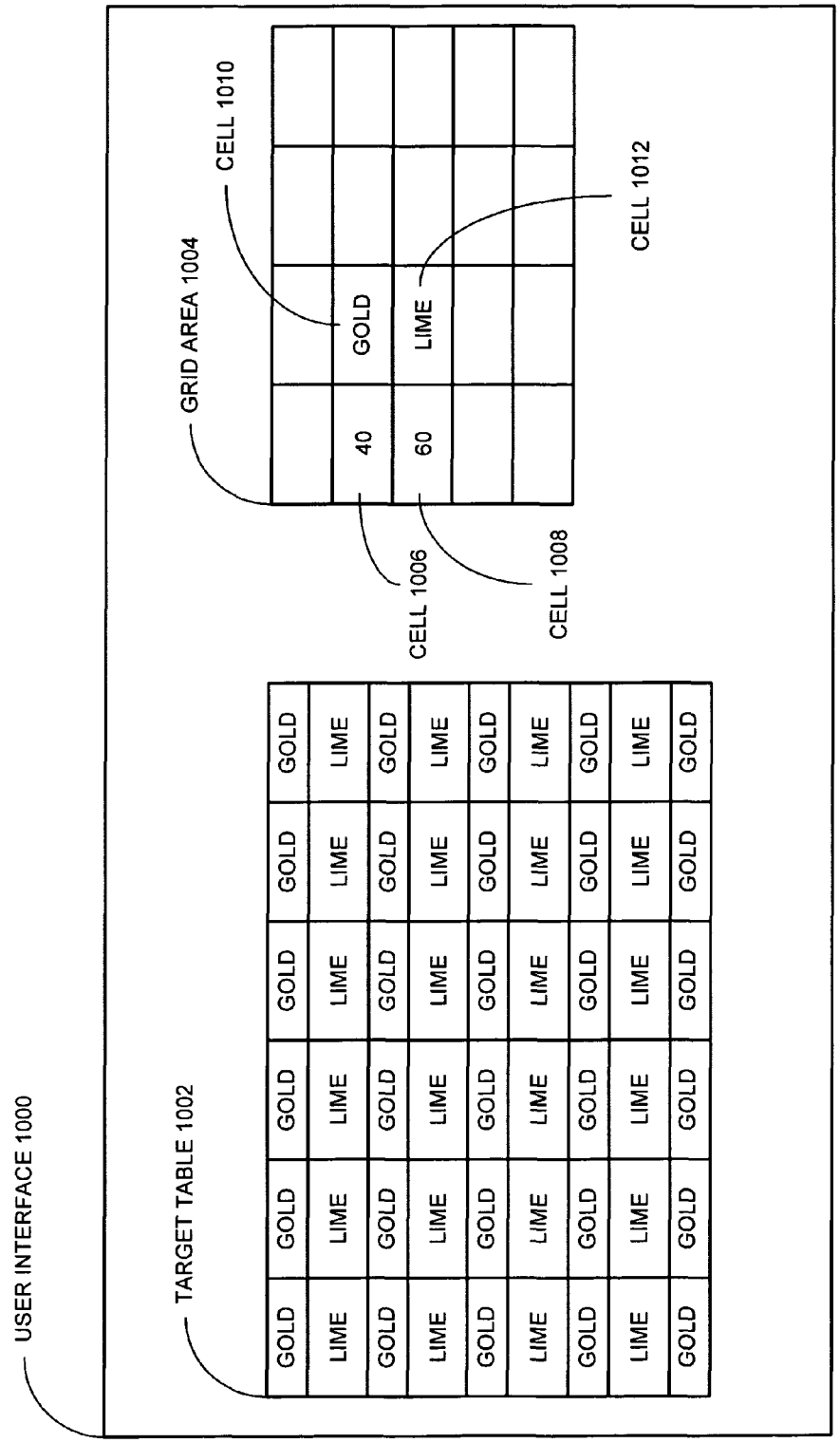
FIG. 10 illustrates a pattern of row heights which is applied to the target table in accordance with an embodiment of the present invention.

FIG. 10 illustrates a pattern of row heights which is applied to target table 1002 within user interface 1000 in accordance with an embodiment of the present invention. In FIG. 10, the user defines a pattern of cell attributes in grid area 1004. The user defines a pattern of alternating row heights by setting cells 1006 and 1008 to 40 units and 60 units, respectively. The user also defines a pattern of alternating row colors by setting cells 1010 and 1012 to gold and lime, respectively. The system repeats or tiles the pattern of cell attributes defined in grid area 1004 across target table 1002. Note that the gold-colored rows are 40 units high and the lime-colored column are 60 units high.

Figure 11:
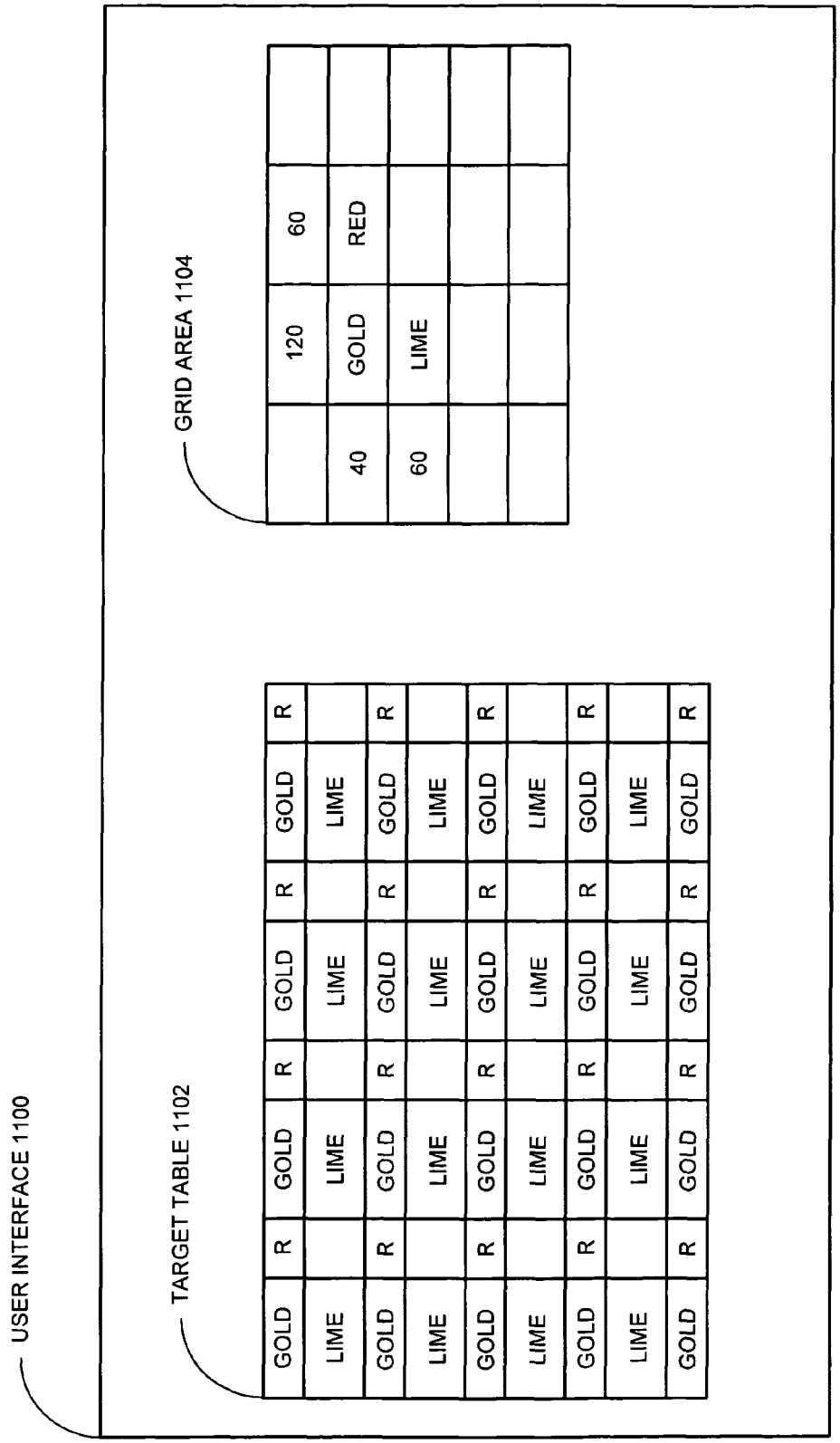
FIG. 11 illustrates a pattern of row heights and column widths which is applied to the target table in accordance with an embodiment of the present invention.

FIG. 11 illustrates a pattern of row heights and column widths which is applied to target table 1102 within user interface 1100 in accordance with an embodiment of the present invention. In FIG. 11, the user defines a pattern of cell attributes in grid area 1104. The user defines a pattern of alternating row heights, column widths, and cell colors. The system repeats or tiles the pattern of cell attributes defined in grid area 1104 across target table 1102.

In one embodiment of the present invention, time is an attribute. In this embodiment, the time attribute specifies a time-interval after which the system performs a specified action. In another embodiment of the present invention, the system repeats the specified action one time-interval after the time when the previous time-interval ended. In one embodiment of the present invention, the action to be taken after a specified time-interval is an attribute.

Hence, the time attribute allows the user to attract the attention of a reader of the table to a specific area of the table. This is useful when the table is large. In one embodiment of the present invention, the actions include, but are not limited to, rotations and mirroring.

Figure 12A:
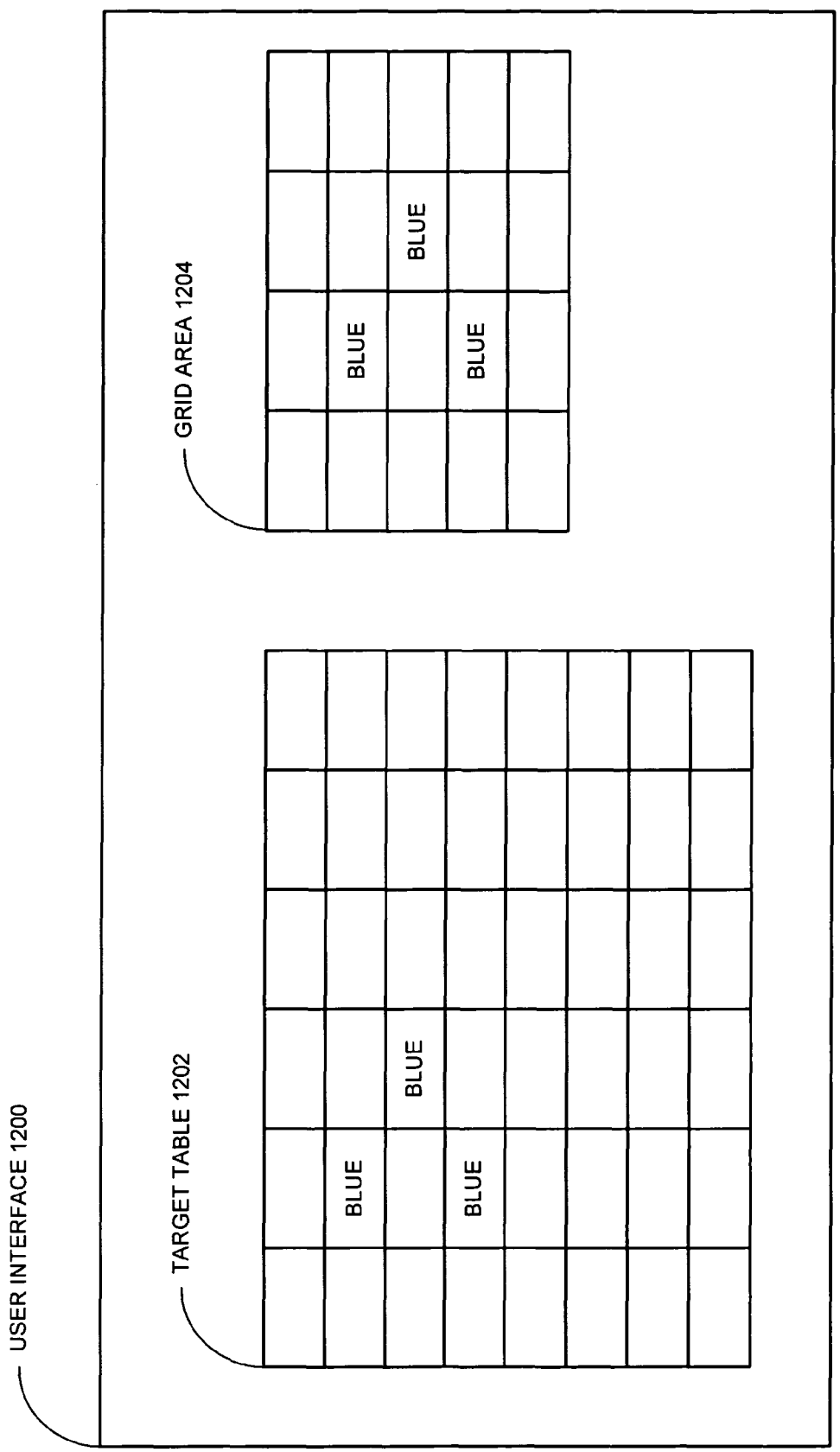
FIG. 12A illustrates a pattern which changes with respect to time in accordance with an embodiment of the present invention.
Figure 12B:
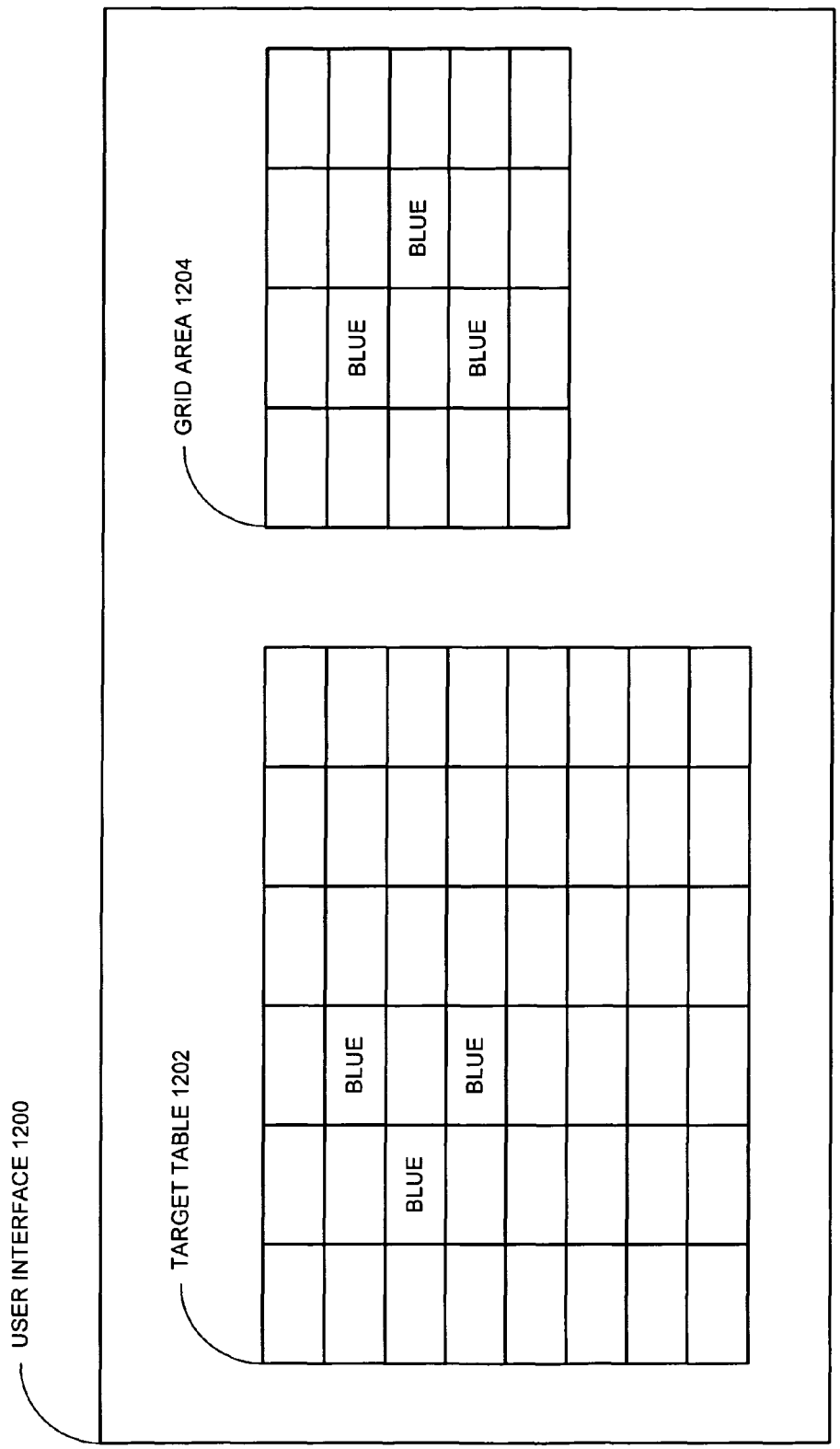
FIG. 12B illustrates a pattern which changes with respect to time in accordance with an embodiment of the present invention.

FIG. 12A illustrates a pattern which changes with respect to time. The pattern is defined in grid-area 1204 and is applied to target table 1202 within user interface 1200. Note that the user specifies a time-interval attribute and an action for the pattern. FIG. 12B illustrates the change in the pattern in target table 1202 after the time-interval has elapsed (i.e. mirror across the vertical axis). Note that the actions can be applied to a target area within target table 1202 which is larger than the area containing the pattern within grid area 1204.

Figure 13A:
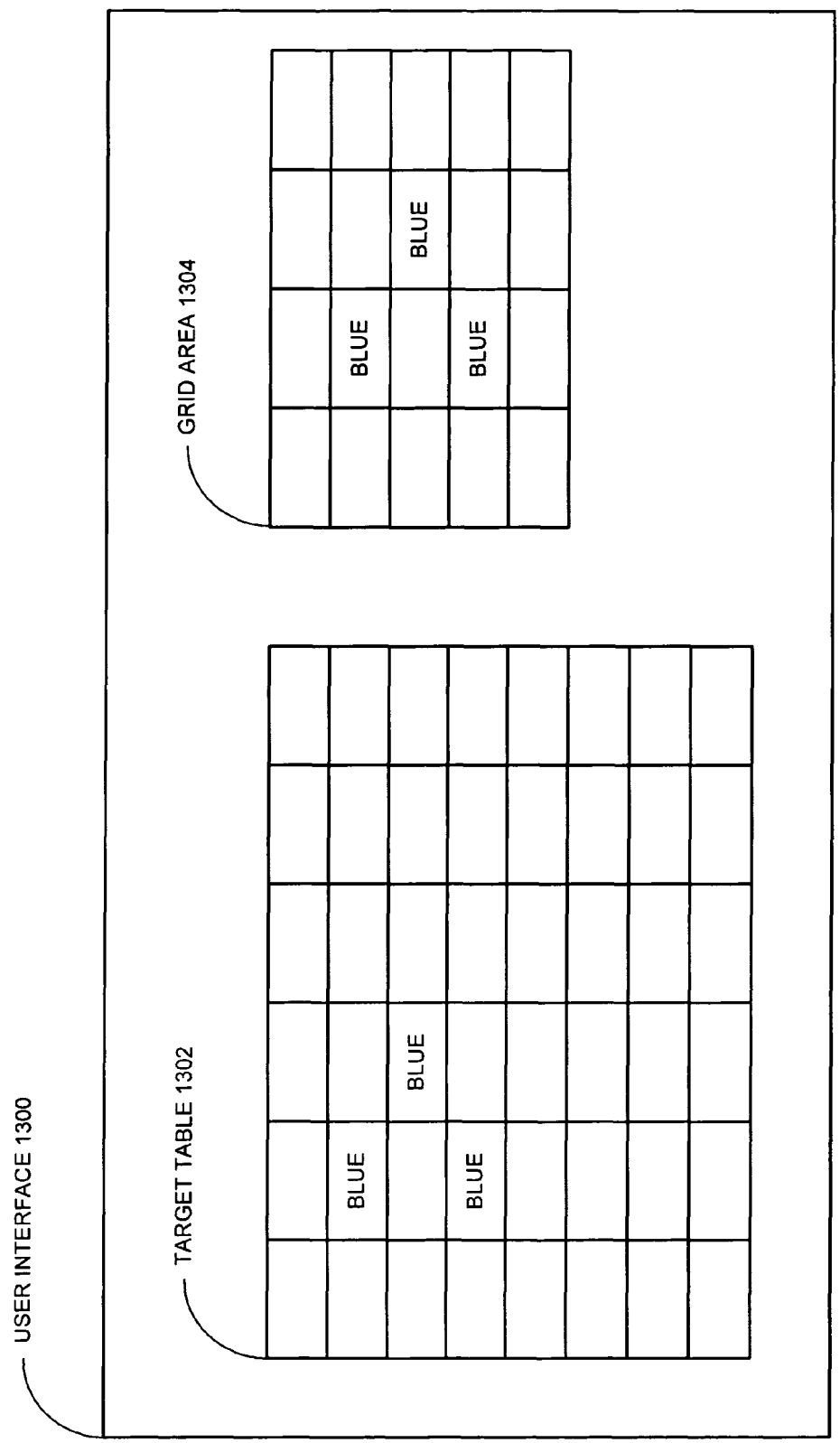
FIG. 13A illustrates another pattern which changes with respect to time in accordance with an embodiment of the present invention.
Figure 13B:
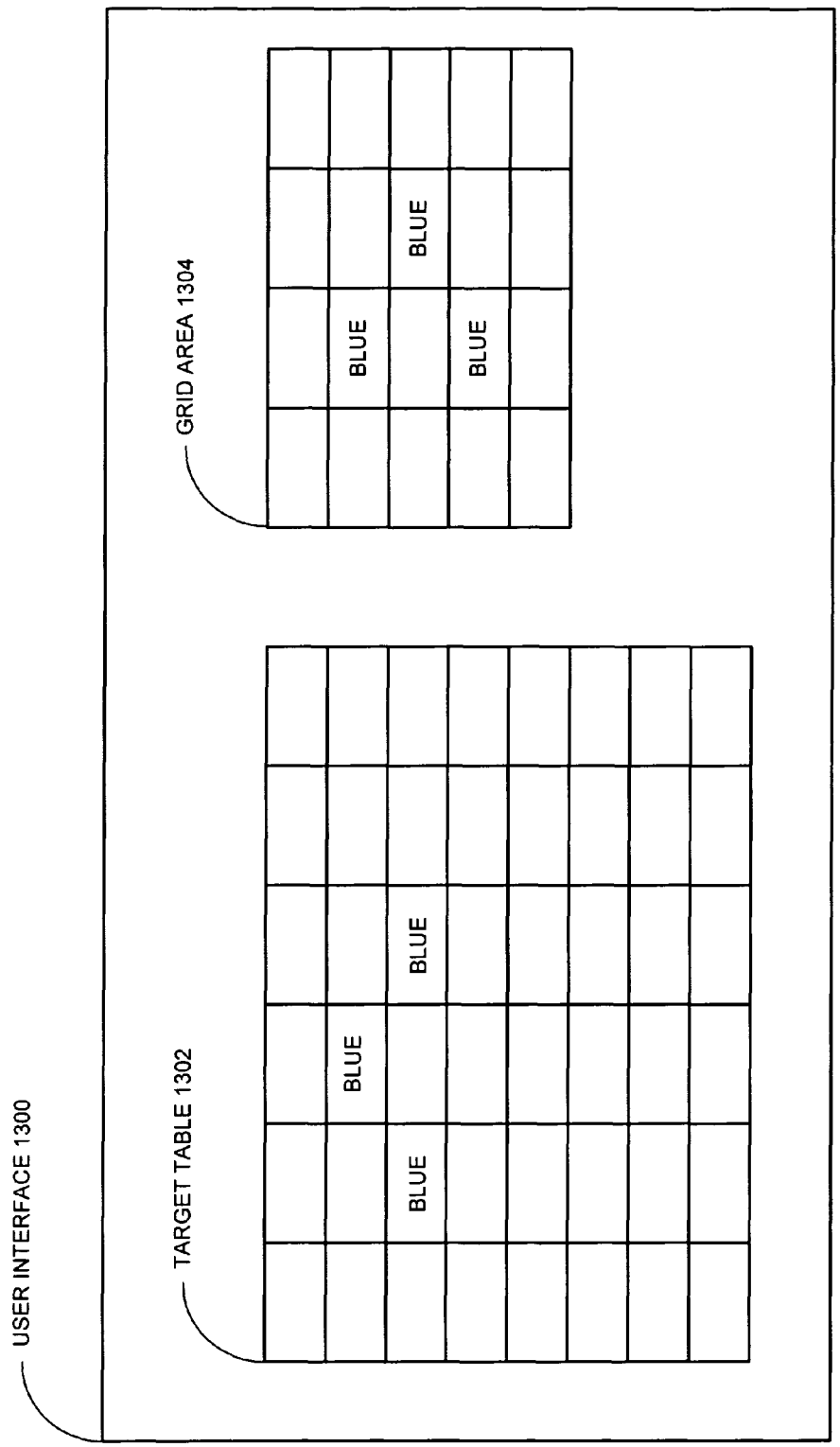
FIG. 13B illustrates another pattern which changes with respect to time in accordance with an embodiment of the present invention.

FIG. 13A illustrates another pattern which changes with respect to time. The pattern is defined in grid-area 1304 and is applied to target table 1302 within user interface 1300. Note that the user specifies a time-interval attribute and an action for the pattern. FIG. 13B illustrates the change in the pattern in target table 1302 after the time-interval has elapsed (i.e. counterclockwise rotation). Again, note that the actions can be applied to a target area within target table 1302 which is larger than the area containing the pattern within grid area 1304.

In one embodiment of the present invention, while tiling or repeating the pattern defined in the grid area, a specified number of rows or columns can be skipped before applying the pattern to the next set of cells in the target table. In this embodiment, a user specifies an attribute which instructs the system to skip m rows and/or n columns before applying the pattern to the next set of cells in the target table. In another embodiment of the present invention, the user specifies an attribute which instructs the system to skip a specified number of rows and/or columns before applying the pattern to the next set of cells in the target table, wherein the number of rows and/or columns skipped is determined based on a mathematical function. Note that the number of rows and the number of columns skipped can be set independently of each other. In one embodiment of the present invention, the mathematical function is an arithmetic progression. In this embodiment, the system places the pattern in the target table, then the system skips one row and/or column before placing the pattern in the target table again, then the system skips two rows and/or columns before placing the pattern in the target table again, then the system skips three rows and/or columns before placing the pattern in the target table again, etc.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates a grid-based approach to defining a repetition pattern of cell styles for repeating or tiling the repetition pattern of cell styles onto a target table, comprising:
    performing by a computer:
        displaying a repetition pattern user interface comprising a grid area,
            wherein the grid area comprises a two-dimensional grid of cells, and
            wherein a cell style for an individual cell within the grid area can be defined independently from every other cell within the grid area;

receiving user input which defines the repetition pattern of cell styles,
  wherein the user input specifies one or more cell styles for one or more cells within the two-dimensional grid of cells,
  wherein each cell style of the one or more cell styles for a given cell within the two-dimensional grid of cells specifies one or more attributes for the given cell, and
  wherein the repetition pattern of cell styles is defined by the one or more cell styles within the two-dimensional grid of cells,
  wherein the two-dimensional grid of cells comprises the repetition pattern of cell styles, and
  wherein the repetition pattern of cell styles is defined separately from the target table; and
applying the repetition pattern of cell styles to the target table,
  wherein said applying comprises repeating or tiling the repetition pattern of cell styles onto the target table.

2. The method of claim 1, further comprising:
in response to a change in the repetition pattern of cell styles, automatically updating the target table to which the repetition pattern of cell styles has been applied,
  wherein said automatically updating comprises automatically repeating or tiling the changed repetition pattern of cell styles across the target table.

3. The method of claim 1, wherein said applying the repetition pattern of cell styles to the target table comprises:
receiving second user input which identifies a portion of the target table to which the repetition pattern of cell styles is applied; and
in response to the received second user input, applying the repetition pattern of cell styles to the identified portion of the target table.

4. The method of claim 1, further comprising:
receiving second user input which identifies the target table to which the repetition pattern of cell styles is applied; and
in response to receiving the second user input which identifies the target table, applying the repetition pattern of cell styles to the entire identified target table.

5. The method of claim 1,
wherein defining the repetition pattern of cell styles involves specifying styles for cells in a three-dimensional grid of table cells; and
wherein applying the repetition pattern of cell styles to the target table comprises repeating or tiling the repetition pattern of cell styles defined in the three-dimensional grid across the target table.

6. The method of claim 1,
wherein the repetition pattern of cell styles comprises one or more sub-table styles;
wherein the sub-table styles are applied to one or more special areas of the target table; and
wherein the one or more special areas of the target table comprise:
  corner cells;
  header rows;
  footer rows;
  first columns; or
  last columns.

7. The method of claim 1, wherein the attributes for cells comprise:
row attributes;
column attributes;
text attributes; or
cell attributes.

8. The method of claim 7, wherein the row attributes comprise row height and keep options, wherein the keep options specify how paragraphs are positioned across pages or columns within a given document.

9. The method of claim 7, wherein the column attributes comprise column width.

10. The method of claim 7, wherein the text attributes comprise paragraph attributes, character attributes, or nested style information.

11. The method of claim 7, wherein the cell attributes comprise stroke, fill color, fill style, overprint, gap color, diagonal lines, cell insets, vertical justification, baseline, clipping, or text rotation.

12. The method of claim 1, wherein the repetition pattern of cell styles is repeated or tiled in a user-specified direction.

13. The method of claim 1, further comprising:
dividing a digital image of an object into a mesh of finite cells; and
repeating or tiling the repetition pattern of cell styles onto the digital image of the object.

14. The method of claim 1,
wherein a time interval and an action are attributes specified in a cell style;
wherein the action comprises a rotation, a mirroring, or other action which is applied to a cell; and
wherein after the time interval has elapsed, the action is performed on the target table.

15. The method of claim 1, wherein while repeating or tiling the repetition pattern of cell styles defined in the two-dimensional grid across the target table, the method further comprises skipping a specified number of rows and/or columns before repeating or tiling the repetition pattern of cell styles to subsequent cells within the target table.

16. A computer-readable storage medium storing instructions that when executed by a computer cause the computer to perform a method that facilitates a grid-based approach to defining a repetition pattern of cell styles for repeating or tiling the repetition pattern of cell styles onto a target table, wherein the method comprises:
displaying a repetition pattern user interface comprising a grid area,
  wherein the grid area comprises a two-dimensional grid of cells, and
  wherein a cell style for an individual cell within the grid area can be defined independently from every other cell within the grid area;
receiving user input which defines the repetition pattern of cell styles,
  wherein the user input specifies one or more cell styles for one or more cells within the two-dimensional grid of cells,
  wherein each cell style of the one or more cell styles for a given cell within the two-dimensional grid of cells specifies one or more attributes for the given cell, and
  wherein the repetition pattern of cell styles is defined by the one or more cell styles within the two-dimensional grid of cells,
  wherein the two-dimensional grid of cells comprises the repetition pattern of cell styles, and
  wherein the repetition pattern of cell styles is defined separately from the target table; and
applying the repetition pattern of cell styles to the target table,
  wherein said applying comprises repeating or tiling the repetition pattern of cell styles onto the target table.

17. The computer-readable storage medium of claim 16, further comprising:
in response to a change in the repetition pattern of cell styles, automatically updating the target table to which the repetition pattern of cell styles has been applied, wherein said automatically updating comprises automatically repeating or tiling the changed repetition pattern of cell styles across the target table.

18. The computer-readable storage medium of claim 16, wherein applying the repetition pattern of cell styles to the target table comprises:
receiving second user input which identifies a portion of the target table to which the repetition pattern of cell styles is applied; and
in response to the received second user input, applying the repetition pattern of cell styles to the identified portion of the target table.

19. The computer-readable storage medium of claim 16, further comprising:
receiving second user input which identifies the target table to which the repetition pattern of cell styles is applied; and
in response to receiving the second user input which identifies the target table, applying the repetition pattern of cell styles to the entire identified target table.

20. The computer-readable storage medium of claim 16, wherein defining the repetition pattern of cell styles involves specifying styles for cells in a three-dimensional grid of table cells; and
wherein applying the repetition pattern of cell styles to the target table comprises repeating or tiling the repetition pattern of cell styles defined in the three-dimensional grid across the target table.

21. The computer-readable storage medium of claim 16, wherein the repetition pattern of cell styles comprises one or more sub-table styles;
wherein the sub-table styles are applied to one or more special areas of the target table; and
wherein the one or more special areas of the target table comprise:
corner cells;
header rows;
footer rows;
first columns; or
last columns.

22. The computer-readable storage medium of claim 16, wherein the attributes for cells comprise:
row attributes;
column attributes;
text attributes; or
cell attributes.

23. The computer-readable storage medium of claim 16, wherein the repetition pattern of cell styles is repeated or tiled in a user-specified direction.

24. A system, comprising:
a memory; and
one or more processors coupled to the memory, wherein the memory comprises program instructions executable by the one or more processors to implement a style definition mechanism configured to:
display a repetition pattern user interface comprising a grid area,
wherein the grid area comprises a two-dimensional grid of cells, and
wherein a cell style for an individual cell within the grid area can be defined independently from every other cell within the grid area;
receive user input which defines the repetition pattern of cell styles,
wherein the user input specifies one or more cell styles for one or more cells within the two-dimensional grid of cells,
wherein each cell style of the one or more cell styles for a given cell within the two-dimensional grid of cells specifies one or more attributes for the given cell, and
wherein the repetition pattern of cell styles is defined by the one or more cell styles within the two-dimensional grid of cells,
wherein the two-dimensional grid of cells comprises the repetition pattern of cell styles, and
wherein the repetition pattern of cell styles is defined separately from the target table; and
apply the repetition pattern of cell styles to the target table,
wherein said applying comprises repeating or tiling the repetition pattern of cell styles onto the target table.

* * * * *

UNITED STATES PATENT AND TRADEMARK OFFICE
CERTIFICATE OF CORRECTION

PATENT NO. : 8,078,955 B1  Page 1 of 1
APPLICATION NO. : 11/416693
DATED : December 13, 2011
INVENTOR(S) : Rahul Gupta It is certified that error appears in the above-identified patent and that said Letters Patent is hereby corrected as shown below:

On The Title Page Item 73:

Under "Assignee", please delete "Adobe Systems Incorportaed", and insert --Adobe Systems Incorporated-- in place thereof.

Signed and Sealed this
Sixth Day of March, 2012

David J. Kappos
*Director of the United States Patent and Trademark Office*